(12) United States Patent
Guisado

(10) Patent No.: US 11,947,488 B2
(45) Date of Patent: Apr. 2, 2024

(54) GRAPHIC MIGRATION OF UNSTRUCTURED DATA

(71) Applicant: SAP SE, Walldorf (DE)

(72) Inventor: Victor Silva Guisado, Heidelberg (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 16/884,376

(22) Filed: May 27, 2020

(65) Prior Publication Data

US 2021/0374093 A1     Dec. 2, 2021

(51) Int. Cl.
| | |
|---|---|
| *G06F 16/11* | (2019.01) |
| *G06F 16/16* | (2019.01) |
| *G06F 16/17* | (2019.01) |
| *G06F 16/174* | (2019.01) |
| *G06F 16/182* | (2019.01) |
| *G06F 16/901* | (2019.01) |

(52) U.S. Cl.
CPC .......... *G06F 16/119* (2019.01); *G06F 16/168* (2019.01); *G06F 16/1734* (2019.01); *G06F 16/1748* (2019.01); *G06F 16/1824* (2019.01); *G06F 16/9024* (2019.01)

(58) Field of Classification Search
CPC .. G06F 16/119; G06F 16/168; G06F 16/1734; G06F 16/1748; G06F 16/1824; G06F 16/214; G06F 16/9024; G06F 16/93
See application file for complete search history.

(56) References Cited

U.S. PATENT DOCUMENTS

| | | | |
|---|---|---|---|
| 8,515,983 B1* | 8/2013 | Snyder, II | G06F 16/9024 |
| | | | 707/798 |
| 8,527,544 B1* | 9/2013 | Colgrove | G06F 3/0641 |
| | | | 707/791 |
| 9,229,942 B1* | 1/2016 | MacNeill | G06F 16/119 |
| 9,275,033 B2* | 3/2016 | Wong | G06F 40/186 |
| 9,424,135 B1* | 8/2016 | Carpenter | G06F 16/113 |
| 9,690,469 B2 | 6/2017 | Martinez et al. | |
| 10,114,843 B2 | 10/2018 | Fischer et al. | |
| 2006/0004750 A1* | 1/2006 | Huang | G06F 16/90 |
| 2007/0027929 A1* | 2/2007 | Whelan | G06F 16/1734 |
| 2007/0130125 A1* | 6/2007 | Holte | G06F 16/958 |

(Continued)

OTHER PUBLICATIONS

Database Migration Tool [available at https://www.qlik.com/us/data-migration/database-migration-tool].

(Continued)

*Primary Examiner* — Taelor Kim
(74) *Attorney, Agent, or Firm* — Mintz Levin Cohn Ferris Glovsky and Popeo, P.C.

(57) ABSTRACT

Aspects of the current subject matter are directed to a user-facing approach for migration of unstructured data. A graphical user interface is provided to enable a user to execute a migration process of attachments between content repositories, where the execution is end to end with simple commands and/or user actions through interaction with the graphical user interface. The commands and/or user actions are translated into a background execution of the steps of the migration process in the proper order with proper parameters. Aspects of the current subject matter provide for the migration process to be transparent to the end user. Logs or reports relating to the migration process may be available and accessible to the user.

20 Claims, 16 Drawing Sheets

(56) References Cited

U.S. PATENT DOCUMENTS

| | | | | |
|---|---|---|---|---|
| 2007/0192140 A1* | 8/2007 | Gropper | ............ | G06F 21/6245 |
| | | | | 715/205 |
| 2009/0260060 A1* | 10/2009 | Smith | ................. | H04L 63/105 |
| | | | | 715/753 |
| 2013/0117289 A1* | 5/2013 | Fischer | ................ | G06F 16/254 |
| | | | | 707/E17.058 |
| 2014/0379586 A1* | 12/2014 | Sawyer | ................. | H04L 67/00 |
| | | | | 705/301 |
| 2015/0160795 A1 | 6/2015 | Bragstad et al. | | |
| 2016/0360062 A1* | 12/2016 | Irons | ................ | H04N 1/32144 |
| 2017/0177649 A1* | 6/2017 | Badrinarayanan | ...... | G06F 21/64 |
| 2018/0253344 A1* | 9/2018 | Deligia | ................ | G06F 16/164 |
| 2019/0108223 A1* | 4/2019 | Fabijancic | ............ | G06F 16/214 |
| 2021/0342785 A1* | 11/2021 | Mann | ..................... | H04L 51/48 |

OTHER PUBLICATIONS

Jadhav, M.B. et al., "GUI based Querying andd Migration Approach for MongoDB," Open Access International Journal of Science & Engineering, vol. 2, iss. 3, Jan. 2017, 5 pages.

\* cited by examiner

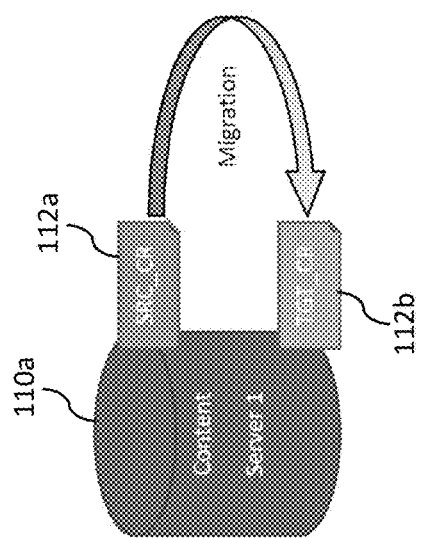
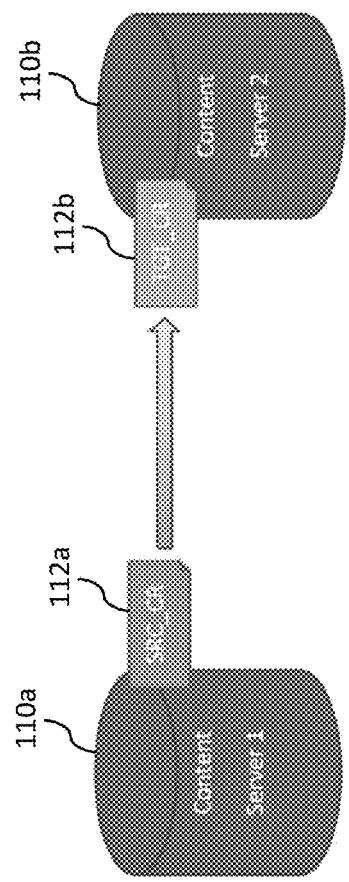
FIG. 3A
FIG. 3B

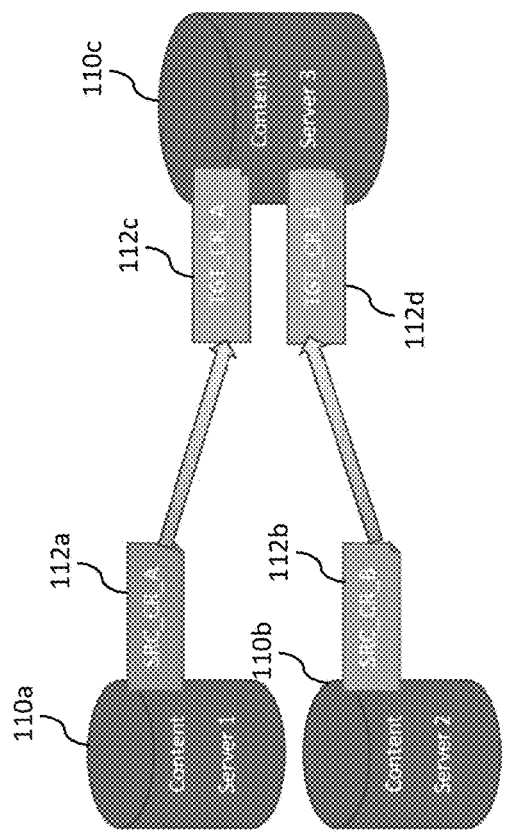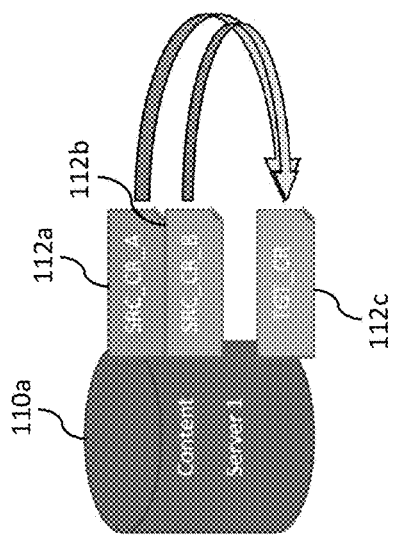
FIG. 3C
FIG. 3D

GRAPHIC MIGRATION OF UNSTRUCTURED DATA

FIELD

The present disclosure generally relates to migration of unstructured data and, more specifically, to migration of unstructured data between content servers, and a user interface to support the migration of unstructured data.

BACKGROUND

Database management systems have become an integral part of many computer systems. Customers may have data stored at one or more content servers for access to the data. The need to migrate data between content servers may be associated with a complex process to ensure data is properly copied and moved.

SUMMARY

Methods, systems, and articles of manufacture, including computer program products, are provided for a user-facing approach for migration of unstructured data between content servers.

According to an aspect, a computer-implemented method includes determining, by a processing device and in response to a user signal from a user device, a storage configuration of data associated with a user, the storage configuration including one or more link tables associated with a content repository of a content server, where the one or more link tables include links to attachments stored in the content server as defined by the content repository; generating, by the processing device and for display at the user device, a graphical user interface including a representation of the storage configuration; receiving, by the processing device and based on user interaction with the graphical user interface, a migration command, the migration command including an indication of moving at least one of a first link table of the one or more link tables, the content repository, and the content server to a target content repository; and migrating, by the processing device, the at least one of the first link table of the one or more link tables, the content repository, and the content server to the target content repository.

According to an inter-related aspect, a system includes at least one data processor and at least one memory storing instructions which, when executed by the at least one data processor, result in operations including determining, in response to a user signal from a user device, a storage configuration of data associated with a user, the storage configuration including one or more link tables associated with a content repository of a content server, where the one or more link tables include links to attachments stored in the content server as defined by the content repository; generating, for display at the user device, a graphical user interface including a representation of the storage configuration; receiving, based on user interaction with the graphical user interface, a migration command, the migration command including an indication of moving at least one of a first link table of the one or more link tables, the content repository, and the content server to a target content repository; and migrating the at least one of the first link table of the one or more link tables, the content repository, and the content server to the target content repository.

According to an inter-related aspect, a non-transitory computer-readable storage medium includes program code, which when executed by at least one data processor, causes operations including determining, by the at least one data processor and in response to a user signal from a user device, a storage configuration of data associated with a user, the storage configuration including one or more link tables associated with a content repository of a content server, where the one or more link tables include links to attachments stored in the content server as defined by the content repository; generating, by the at least one data processor and for display at the user device, a graphical user interface including a representation of the storage configuration; receiving, by the at least one data processor and based on user interaction with the graphical user interface, a migration command, the migration command including an indication of moving at least one of a first link table of the one or more link tables, the content repository, and the content server to a target content repository; and migrating, by the at least one data processor, the at least one of the first link table of the one or more link tables, the content repository, and the content server to the target content repository.

In some variations, one or more of the features disclosed herein including the following features can optionally be included in any feasible combination. Determining the storage configuration may include performing a domain search to identify standard tables and custom tables containing links to attachments; removing duplicate links from the identified standard tables and the identified custom tables; and identifying the content repository and the content server, the identification based on data associated with the identified standard tables and the identified custom tables. The representation of the storage configuration may include a plurality of icons, each of the plurality of icons representative of one of the one or more link tables, the content repository, and the content server. The user interaction may include one or more of a drag and drop operation and entry of input data. The target content repository may be one of associated with the content server or associated with a second content server. The migration may include migrating the attachments to the target content repository; and updating the links in the content repository. The content repository may include a logical structure that defines where the attachments are stored in the content server. A database management system may include the one or more link tables.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A-FIG. 3F are diagrams illustrating exemplary migration processes between content servers and/or content repositories consistent with implementations of the current subject matter;

Figure 1:
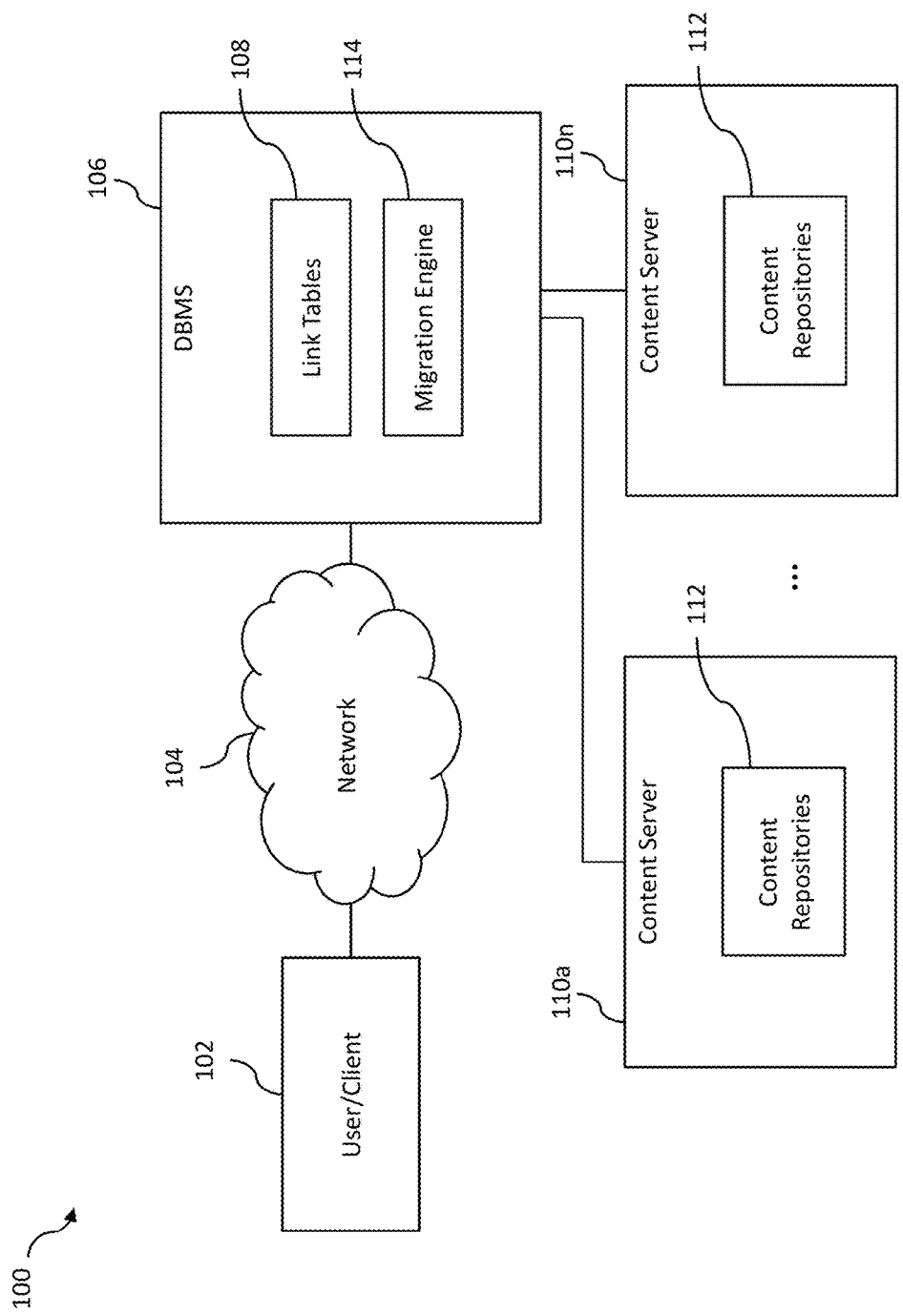
FIG. 1 is a system diagram illustrating a data storage system in which implementations of the current subject matter may be employed.

Like labels are used to refer to same or similar items in the drawings.

DETAILED DESCRIPTION

Aspects of the current subject matter are directed to a user-facing approach for migration of unstructured data between content servers. Customers may wish to move unstructured data between content servers and/or move unstructured data from one content repository in a content server to another content repository in the content server. According to aspects of the current subject matter, a content server is a network-connected computing device that manages content for customer access of the content. According to aspects of the current subject matter, a content repository is a logical structure that defines a place in which content are stored in the content server. Each content repository may have associated with it a name (e.g., a content repository identifier (ID)) and a description. Some aspects of the current subject matter are described herein with reference to attachments, where attachments are a type of unstructured data that is stored in a content server as defined by a content repository.

A typical migration of unstructured data stored as an attachment in a content server (e.g., an Archive Link content server) is a complex process done in multiple steps and generally requires the expertise of a data management consultant or the like. Consulting tools may support the process of the migration, but consulting fees typically accompany such consulting tools. Thus, the migration of unstructured data in content servers according to existing techniques is costly. Moreover, restrictions related to availability of an experienced data management consultant or the like are also incurred due to there being a restricted number of consultants who can deal with existing migration framework. A simplified, user-facing approach for the migration of unstructured data between content servers is thus desired.

The inherent complexity of the existing migration process of unstructured data between content servers is illustrated by the following summary of steps. First, the database management system is searched to identify tables with links to attachments. The identified links need to then be prepared for migration to avoid redundant migration of the same attachments (in situations in which an attachment is linked more than once). The migration then needs to be executed to migrate the attachments to a new content server. After the execution of the migration, a comparison is optionally executed to compare the original attachments and the copies created in the new content server. Next, the links in the tables are updated so that they point to the new attachments. The original attachments are optionally deleted (e.g., removed from the old content server). Usage of reports relating to each of these steps requires deep knowledge of the tools necessary for implementing each step.

Moreover, the existing migration process requires significant interaction between the expert executing the migration and the system. Each step is executed by the expert, and the results provided by the system are manually evaluated by the expert so that the next step to be executed can be determined and planned. For a typical migration, the expert must trigger in the system the execution of several reports multiple times. In a situation in which the number of attachments to migrate exceeds one million, parallel execution is needed and/or recommended to minimize execution time. To execute the migration process, the expert is required to manually select the attachments to be migrated by each parallel process. For example, in a case of a 50 million attachment migration where parallelization is needed, the user must do 50 groups of one million attachments and trigger 50 times the migration report. The number of user interactions with the system increases exponentially with the number of content repositories and the number of desired parallel processes.

Aspects of the current subject matter are directed to providing a graphical user interface to enable a user to execute a migration process of attachments between content repositories, where the execution is end to end with simple commands and/or user actions through interaction with the graphical user interface (e.g., mouse clicks and drag and drop operations). Consistent with implementations of the current subject matter, the commands and/or user actions are translated into a background execution of the steps of the migration process in the proper order with proper parameters, as described herein. Aspects of the current subject matter provide for the migration process to be transparent to the end user. Aspects of the current subject matter may be built on top of the existing Archive Link migration framework developed by SAP SE and may include the associated intelligence that is required to execute the migration including the migration steps. Logs or reports relating to the migration process may be available and accessible to the user.

Migration operations consistent with implementations of the current subject matter provide for migration of attachments between content repositories. According to some implementations, a source attachment needs to be accessible in read mode by a user executing the migration. Moreover, a target content repository needs to be accessible in write mode by the user executing the migration. In some implementations, if one or more of these conditions are not met, the migration of attachments may not occur.

FIG. 1 illustrates a system diagram illustrating an exemplary data storage system 100, according to some implementations of the current subject matter. The system 100 may include a database management system (DBMS) 106, one or more content servers 110 (e.g., content server 110a and content server 110n), and a user/client 102. The content servers 110 may include one or more content repositories 112. While two content servers 110a and 110n are shown, implementations of the current subject matter are not limited to a particular number of content servers 110. Moreover, the content servers 110 are not limited to a particular number of content repositories 112.

The content servers 110 may be communicatively coupled with the database management system 106 that may include link tables 108 and a migration engine 114. According to aspects of the current subject matter, a link table 108 is a database table in a customer's database management system (e.g., the database management system 106). The link table 108 stores links to attachments that are stored in the content servers 110. A link to an attachment may be defined by a combination of a content repository ID and a document identifier (ID), and/or a storage category and a document ID. The storage category may be mapped to a content repository.

The database management system 106 may be configured to respond to requests from one or more users/clients 102 of the data storage system 100. The users/clients 102 may communicate with the database management system 106 via a network 104, which may be any wired and/or wireless network including, for example, a public land mobile network (PLMN), a wide area network (WAN), a local area network (LAN), a virtual local area network (VLAN), the Internet, and/or the like. The users/clients 102 may send to the database management system 106 a request that requires access to one or more of the attachments that are stored in the content servers 110. Access to the attachments may be fulfilled by accessing the link table 108 to identify the content repository 112 in which the attachment is stored. The migration engine 114 functions to facilitate the user-facing migration process and the display of the associated graphical user interfaces consistent with implementations of the current subject matter.

Figure 2:
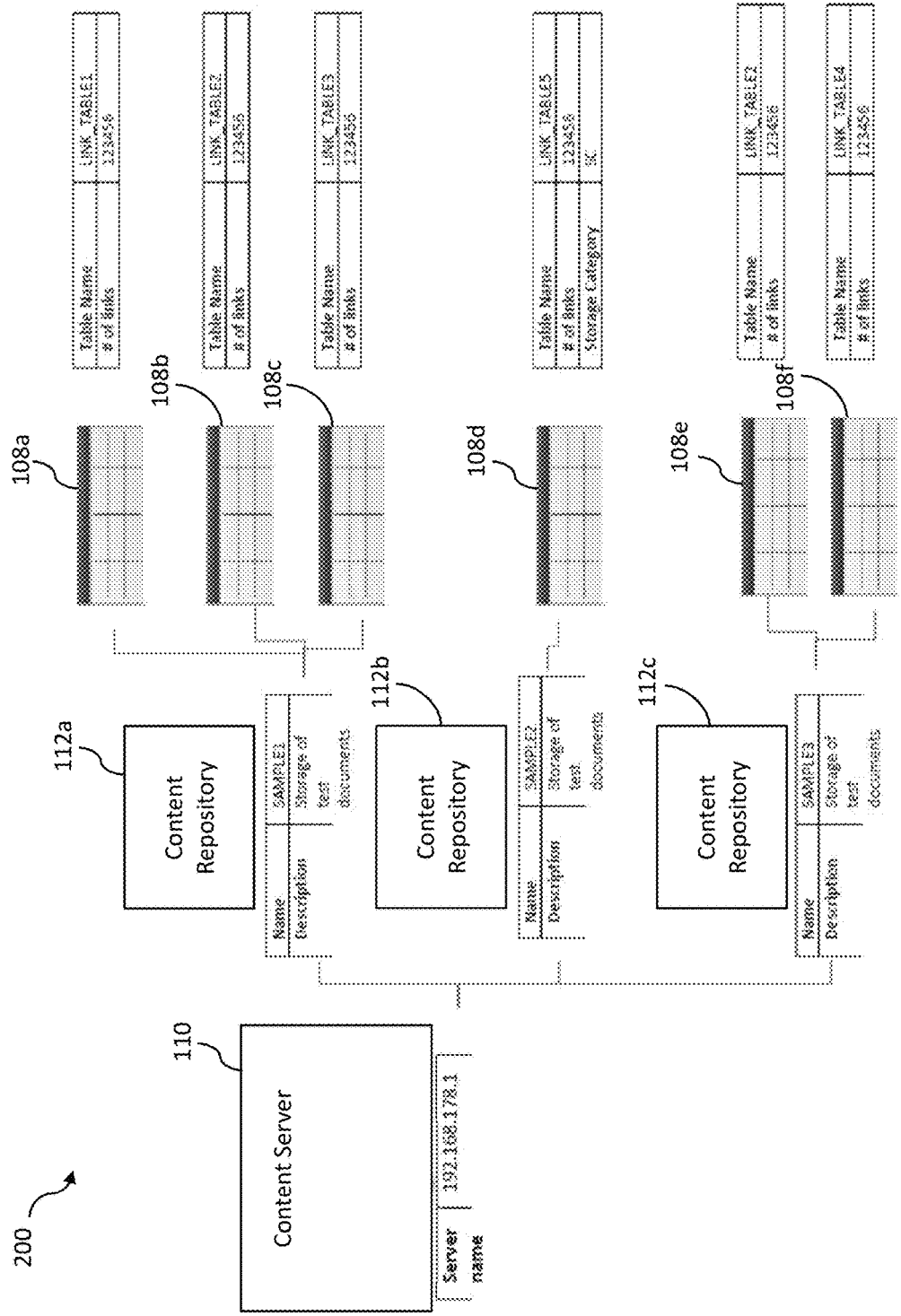
FIG. 2 is a diagram depicting a representation of a content server and content repositories consistent with implementations of the current subject matter.

FIG. 2 is a diagram depicting a representation 200 of a content server 110 and content repositories 112a, 112b, and 112c, consistent with implementations of the current subject matter. The server name of the content server 110 is shown, as is the content repository ID and the description of each of the content repositories 112a, 112b, and 112c. Also shown in the representation 200 are the link tables 108 of each of the content repositories 112a, 112b, and 112c (e.g., link tables 108a, 108b, 108c of the content repository 112a; link table 108d of the content repository 112b; and link tables 108e and 108f of the content repository 112c). As illustrated in the representation 200, the links of the first content repository 112a are stored in three different link tables 108a, 108b, 108c; the links of the second content repository 112b are stored in one link table 108d; and the links of the third content repository 112c are stored in two link tables 108e and 108f.

According to aspects of the current subject matter, a system-wide scan of the database management system 106 is done to identify the link tables 108 associated with the content repositories 112 and the associated content servers 110. The system-wide scan may be, for example, a domain search. Each link table 108 may have associated with it a table name, a number of links, and a storage category. The storage category may be included if, for example, the link table 108 does not contain the content repository 112.

Figure 3E:
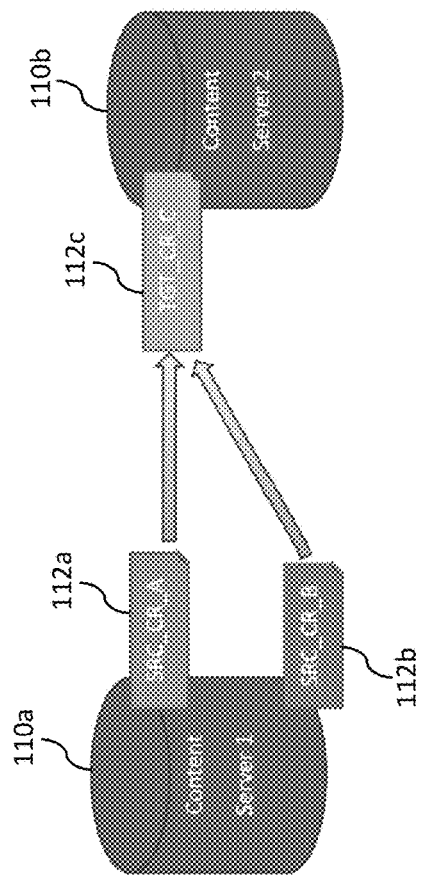

FIG. 3A-FIG. 3F are diagrams illustrating exemplary migration processes between content servers and/or content repositories consistent with implementations of the current subject matter. FIG. 3A illustrates a migration scenario 300 in which migration is within one content server 110. The attachments are moved from a source content repository 112a in the content server 110 to a target content repository 112b in the same content server 110.

FIG. 3B illustrates a migration scenario 310 in which migration is from one content server 110a to a second content server 110b. The migration scenario 310 may be, for example, a migration to the cloud. For example, a source content repository 112a is migrated to a target content repository 112b in the second content server 110b.

FIG. 3C illustrates a migration scenario 320 in which two content repositories, a first source content repository 112a and a second source content repository 112b, are spread among two content servers, a first content server 110a and a second content server 110b. The first source content repository 112a and the second source content repository 112b are migrated to respective target content repositories 112c and 112d in a third content server 110c. The migration scenario 320 may represent, for example, migration of content repositories to a content server in the cloud.

FIG. 3D illustrates a migration scenario 330 in which content repositories are consolidated in the same content server. For example, two source content repositories 112a and 112b are migrated to a target content repository 112c, all within the same content server 110.

FIG. 3E illustrates a migration scenario 340 in which content repositories are consolidated from the same content server to a new content server. For example, two source content repositories 112a and 112b in a first content server 110a are migrated to a target content repository 112c in a second content server 110b.

Figure 3F:
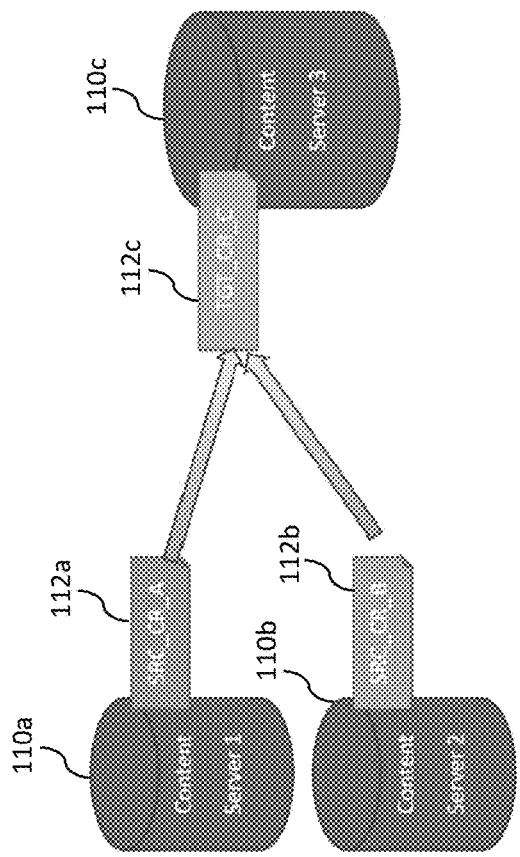

FIG. 3F illustrates a migration scenario 350 in which content repositories from different content servers are consolidated to a new content server. For example, a first source content repository 112a in a first content server 110a and a second source content repository in a second content server 110b are migrated to a target content repository 112c in a third content server 110c.

Consistent with implementations of the current subject matter, migration of a system may be a combination and/or extended versions of the migration scenarios described with reference to FIG. 3A-FIG. 3F. For example, the complexity of a scenario for a particular customer may grow with the age of the system.

Once initiated, the user-facing migration process according to aspects of the current subject matter may display a list and/or a representation of the content servers 110 associated with the customer and/or the database management system 106. Details related to a content server 110 may be displayed and/or accessible by user selection of the content server 110 (e.g., double clicking an icon, selection via a dropdown menu, entry in a search box, etc.). Upon user selection of the content server 110, a system scan may be initiated to identify the content repositories 112 stored in the content server 110. For each of the identified content repositories 112, the link tables 108 that store information about the identified content repository may be identified. A graphical layout of the content server 110, the content repositories 112, and the link tables 108 may be generated for display on the graphical user interface.

Figures 4A, 4B:
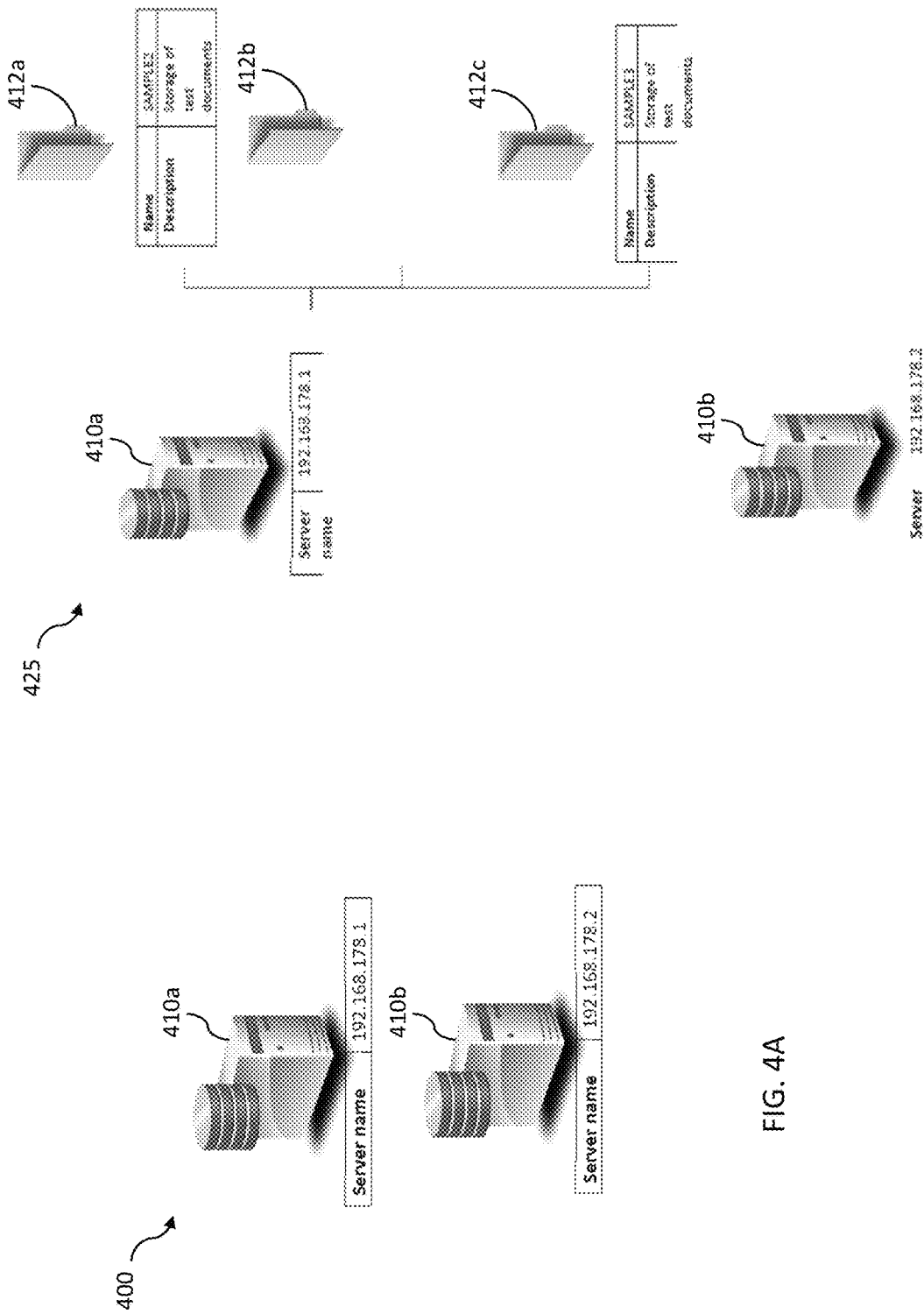
FIG. 4A-FIG. 4C are diagrams illustrating exemplary generated layouts of a migration process consistent with implementations of the current subject matter.
Figure 4C:
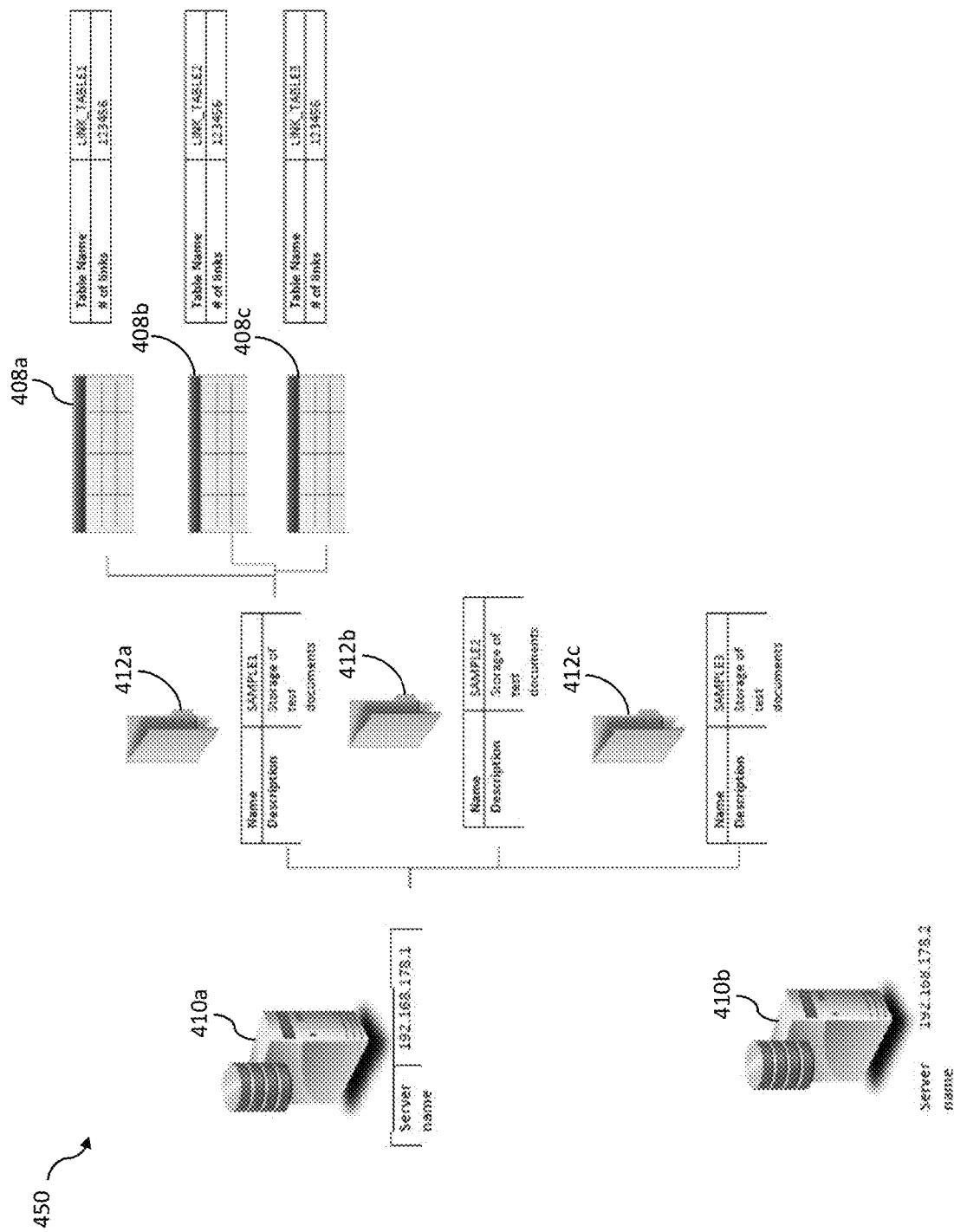

For example, and with reference to FIG. 4A-FIG. 4C, example generated layout depictions of a migration process are illustrated, consistent with implementations of the current subject matter. The layout depictions are examples of those that may be provided on a graphical user interface (e.g., at the user/client 102). FIG. 4A illustrates an exemplary layout 400 including representations (e.g., icons) 410a and 410b of the content servers 110a and 110b that may be provided upon initiation of the migration process. FIG. 4B illustrates an exemplary layout 425 that may be constructed and displayed upon user selection of the icon 410a of the first content server 110a. As shown, representations (e.g., icons) 412a, 412b, and 412c of the content repositories 112a, 112b, and 112c, including the content repositories ID and description, stored in the content server 110a are depicted.

FIG. 4C illustrates an exemplary layout 450 that may be constructed upon user selection of the icon 412a of the first content repository 112a. As shown, information relevant to the first content repository 112a may be depicted. The relevant information is, according to aspects of the current subject matter, in the forms of representations (e.g., icons) 408a, 408b, and 408c of the link tables 108a, 108b, and 108c in which the links of the first content repository 112a are stored. The table name and the number of links may be included as part of the representations 408a, 408b, and 408c.

The layout depictions of FIG. 4A-FIG. 4C are purely exemplary and non-limiting. Various types of representation, icons, and layouts may be utilized as part of the graphical user interface that is generated according to implementations of the current subject matter.

Consistent with implementations of the current subject matter, migration of attachments may be done between content repositories 112. That is, the link remains stored in the same table. No table change of a given link is allowed, according to implementations of the current subject matter. However, the links of a content repository 112 stored in one link table 108 may be migrated to one content repository 112, and the links stored in a second link table 108 may be migrated to another content repository 112.

Migration from one content repository to another may be triggered in the following manners, according to some implementations. The user may drag a content server icon and drop it in a content repository of another content server, thus triggering the migration of all content repositories stored in the dragged (source) content server to the content repository where the drop happened. The user may drag a content repository icon and drop it on another content repository, thus triggering the migration of all the attachments in the dragged (source) content repository to the content repository where the drop happened. The user may drag a table icon from a content repository and drop it on another content repository, thus triggering the migration of the attachments from the dragged table (source) from the content repository to the content repository where the drop happened. Alternatively or additionally to the drag and drop operations, the migration operations may be selected and initiated through one or more other actions on the graphical user interface, such as drop down menus, field entries, and/or the like.

During the migration process, additional information may be displayed to indicate the progress of the migration in, for example, a progress bar or the like. For example, the progress bar may be positioned under, above, or next to one or more of the source table icon, the content repository icon, and the content server icon to indicate progress of the migration. In some implementations, when the migration is completed, the progress bar may indicate 100%. Moreover, in some implementations, when the migration is completed, one or more of a delete icon, a check icon, an undo icon, and a results icon may be displayed.

The delete icon (or button) provides for, upon selection by the user, the migrated documents being deleted from the source content repository. There may be two delete buttons, one at the table level and one at the repository level. At the table level, selection of the delete button may trigger the deletion of the attachments from the content repository whose links are stored in the table to which the delete button belongs. At the repository level, selection of the delete button may trigger the deletion of all of the attachments stored in the content repository to which the delete button belongs.

The check icon (or button) provides for, upon selection by the user, a comparison of the migrated attachments with the source attachments. There may be two check buttons, one at the table level and one at the repository level. At the table level, selection of the check button may trigger comparison of the attachments from the content repository whose links are stored in the table to which the check button belongs. At the repository level, selection of the check button may trigger comparison of all of the attachments stored in the content repository to which the check button belongs. During the comparison processes, a comparison progress bar or the like may be generated and updated to indicate progress of the comparison. Additionally, after completion of the comparison processes, a new icon or button, such as a show comparison results button, may be provided on the graphical user interface.

The undo icon (or button) provides for, upon selection by the user, the migrated attachments being deleted from the target content repository and the links being updated to point again to the old content repository. There may be two undo buttons, one at the table level and one at the repository level. At the table level, selection of the undo button may trigger the deletion of the migrated attachments whose links are stored in the table to which the button belongs. At the repository level, selection of the undo button may trigger the deletion of all of the migrated documents stored in the content repository to which the button belongs.

A show migration results icon (or button) may provide for, upon selection, a new window or text box overlay or the like that displays the results of the migration. There may be two show migration results buttons, one at the table level and one at the repository level. At the table level, selection of the show migration results button may trigger a display of a list with the status of the attachments from the content repository whose links are stored in the table to which the button belongs. At the repository level, selection of the show migration results button may trigger a display of a list with the status of all of the attachments stored in the content repository to which the button belongs.

A show comparison results icon (or button) may provide for, after comparison completion and upon selection, a new window or text box overlay or the like that displays the results of the comparison operation. There may be two show comparison results buttons, one at the table level and one at the repository level. At the table level, selection of the show comparison results button may trigger a display of a list with the comparison results of the attachments from the content repository whose links are stored in the table to which the button belongs. At the repository level, selection of the show comparison results button may trigger a display of a list with the comparison results of all of the attachments stored in the content repository to which the button belongs.

Consistent with implementations of the current subject matter, existing reports from the Archive Link migration framework or the like may be used to execute the analysis, migration, and deletion of attachments. These reports may have a set of options that are maintained with default values in, for example, the reports selection screens. Some of the values or parameters are used to, for example, enable parallel processing of attachments or to limit the selection of attachments to migrate to a given period of time. Aspects of the current subject matter may provide a screen and/or input fields in which the user may enter customized values or parameters for the migration. For example, one parameter that may be inputted by the user may be a number of processes to use for the processing for migration, deletion, and/or comparison. A value larger than one may trigger the selected action in as many background processes as indicated. Another parameter may be a size of the processing block for migration, deletion, and/or comparison. A small value may reduce the amount of system memory used but may increase the number of database accesses. Less database accesses may typically imply more performance at the cost of more resources usage. An additional customization parameter that may be provided allows for the user to maintain the attachment identifier for the migration process.

FIG. 5A-FIG. 5E are diagrams illustrating aspects of the migration process and user actions consistent with implementations of the current subject matter. According to aspects of the current subject matter, the migration process may require user input to indicate the desired mapping of the source and target repositories, from which the target content repository and the target content server can be determined for each attachment. User input may also be required to indicate the maximum number of parallel processes to be used during the migration. In some instances, the maximum number of parallel processes may be system defined and/or may be based on various factors related to the system, such as number of content repositories and/or number of attachments.

The migration process according to aspects of the current subject matter as implemented at least in part by the migration engine 114 includes an analysis of the scenario or configuration of the link tables 108, the content servers 110 and/or the content repositories 112, an identification of the link tables 108 with links to attachments, a triggering of the migration process, a determination of a number of processes to use, and a determination of the attachments to migrate. In some instances, upon the user initiating the migration process (e.g., by accessing the migration engine 114 or other action or selection), the migration engine 114 may respond by performing the analysis of the scenario or configuration of the link tables 108, the content servers 110, and/or the content repositories 112 to identify the current scenario (e.g., layout or system configuration) and build the corresponding graphical user interface, allowing for the user to interact and provide instructions for a desired migration process.

Figure 5A:
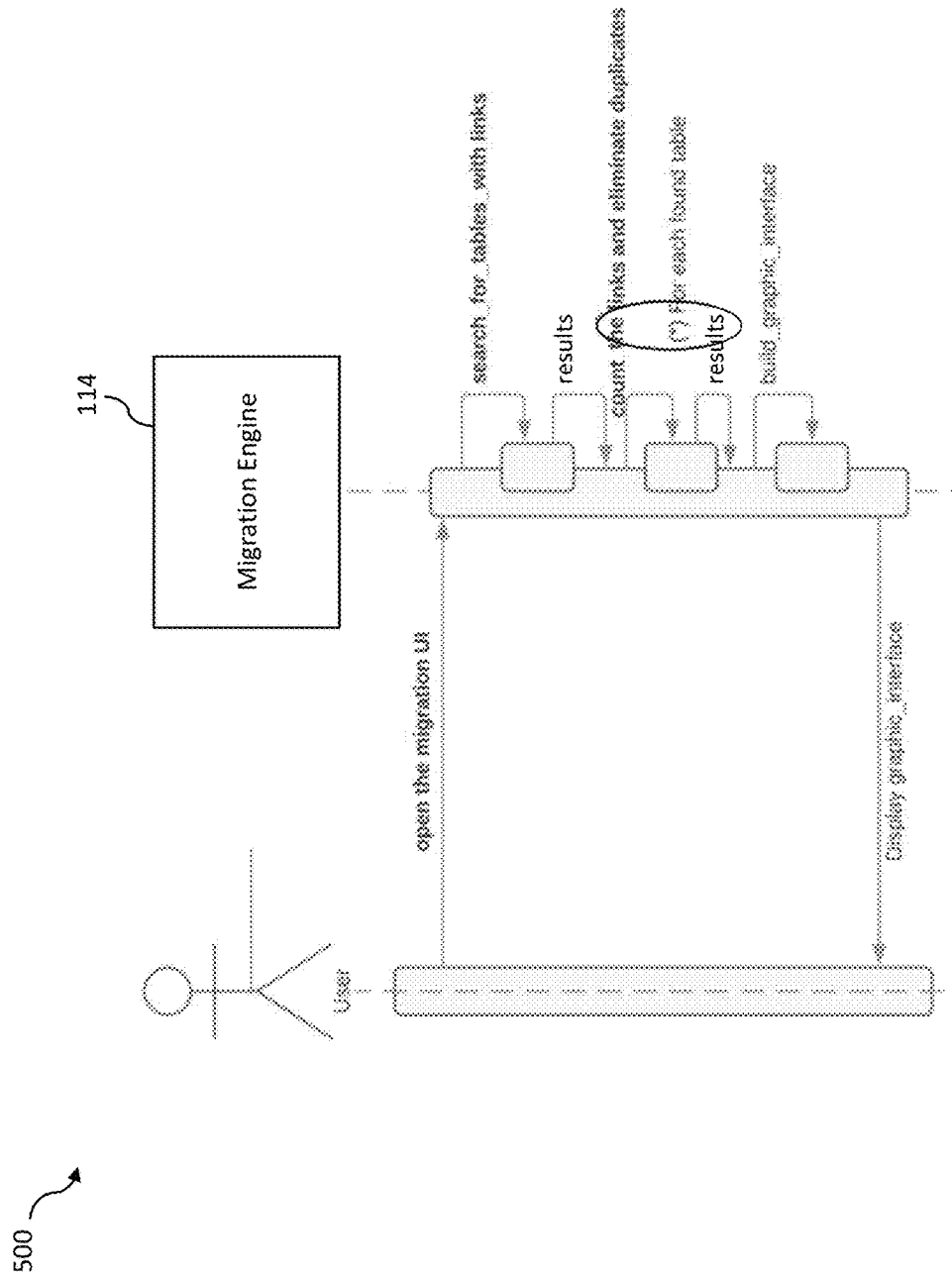
FIG. 5A-FIG. 5E are diagrams illustrating a migration process and user actions consistent with implementations of the current subject matter.

Diagram 500 of FIG. 5A illustrates user and migration engine 114 communication and processes related to initiating or triggering the migration process, according to aspects of the current subject matter. As illustrated, the user (e.g., at the user/client 102) may open the migration user interface or may send a user signal to indicate that the user wishes to perform a migration process (or view details related to the link tables 108, the content repositories 112, and the content servers 110 associated with the user). In response to the user opening the migration user interface or the user signal, the migration engine 114 performs a search for link tables 108 (e.g., in the database management system 106). Consistent with implementations of the current subject matter, the search for link tables may be a domain search to identify both standard and custom (e.g., user created and/or customized) tables that contain links to attachments.

The results of the search for the link tables 108 are then analyzed to count the links contained in the link tables 108 and to remove or eliminate duplicate links. Once the link tables 108 are obtained with any duplicate links removed, the graphical user interface that includes a representation of the link tables 108, the associated content repositories 112, and/or the associated content servers 110 may be generated and displayed at the user/client 102. As the link tables 108 store links to attachments and are identified by a combination of a content repository ID and a document identifier (ID), and/or a storage category (mapped to a content repository) and a document ID, the associated content repositories 112 and content servers 110 may be identified, allowing for the graphical user interface to be built. According to aspects of the current subject matter, the graphical user interface may include a representation such as the representation 200 of FIG. 2 and/or the layouts 400, 425, and/or 450 of FIG. 4A-FIG. 4C, or variations thereof.

Once the graphical user interface with the current scenario or configuration of the link tables 108, the content servers 110 and/or the content repositories 112 is shown, the user may trigger the desired migration process. The triggering of the desired migration process may be through one or more drag and drop operations on the graphical user interface, or through the user entering data through a configuration or parameterization screen, or a combination thereof.

The drag and drop operations may include the user selecting, with a mouse, stylus, touch pad, or the like, a link table 108, a content repository 112, or a server 110, and dragging and dropping the selected item to a target content repository.

Figure 5B:
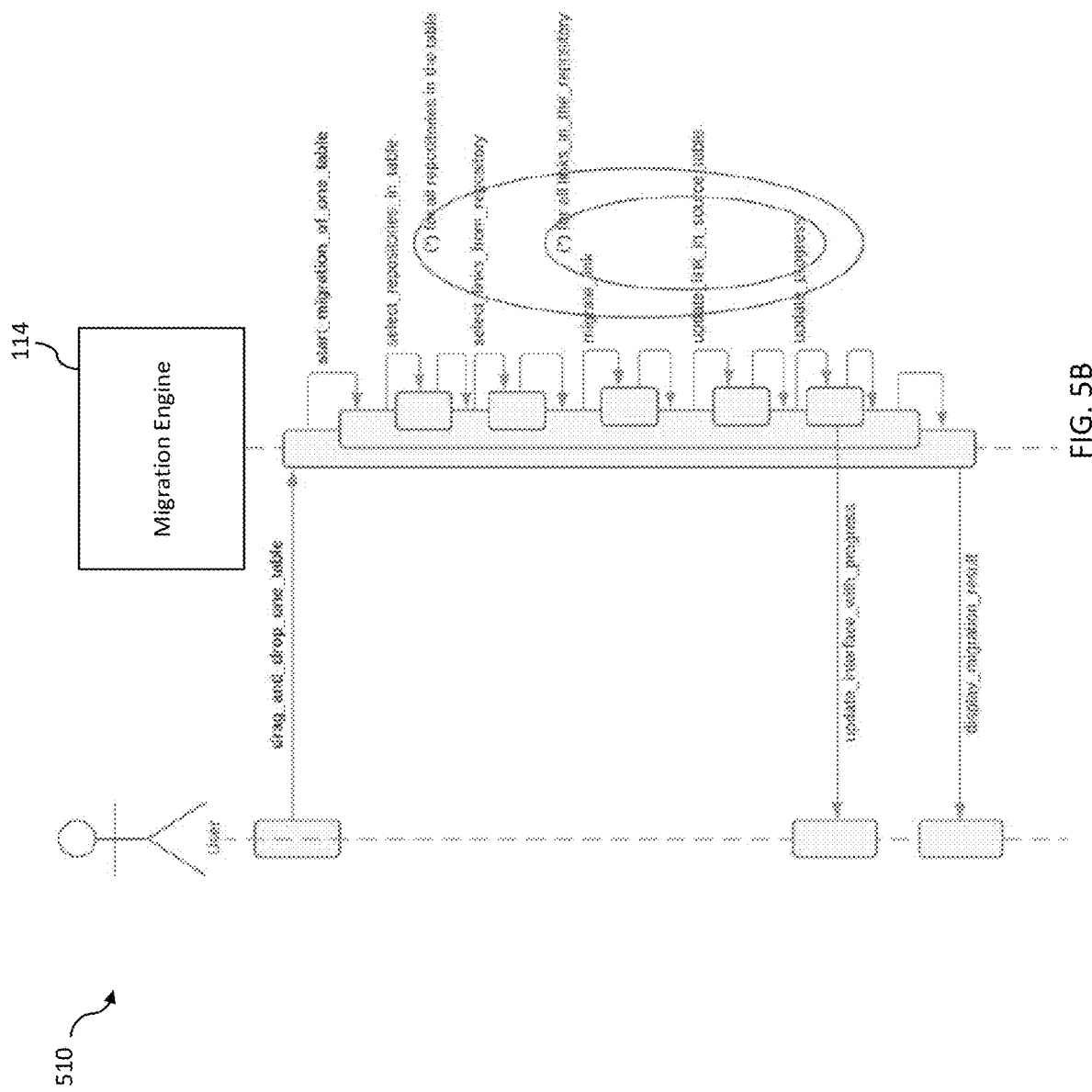

Diagram 510 of FIG. 5B illustrates user and migration engine 114 communication and processes for the migration of a link table 108, according to aspects of the current subject matter. As illustrated, in response to the user dragging and dropping a link table 108 into a content repository 112, the migration engine 114 begins migration of the link table 108. The migration of the link table 108 includes migrating all of the attachments linked in the link table 108 to the content repository 112. In particular, the content repository 112 identified in the link table 108 is selected. The links are selected and each is migrated to the content repository 112. The link in the source content repository is then accordingly updated. In some implementations, progress of the migration may be updated after each link is updated in the source content repository, and the progress of the migration may be displayed on the graphical user interface so that the user may monitor and/or be kept informed of the progress. In some implementations, a migration result may be displayed on the graphical user interface.

Figure 5C:
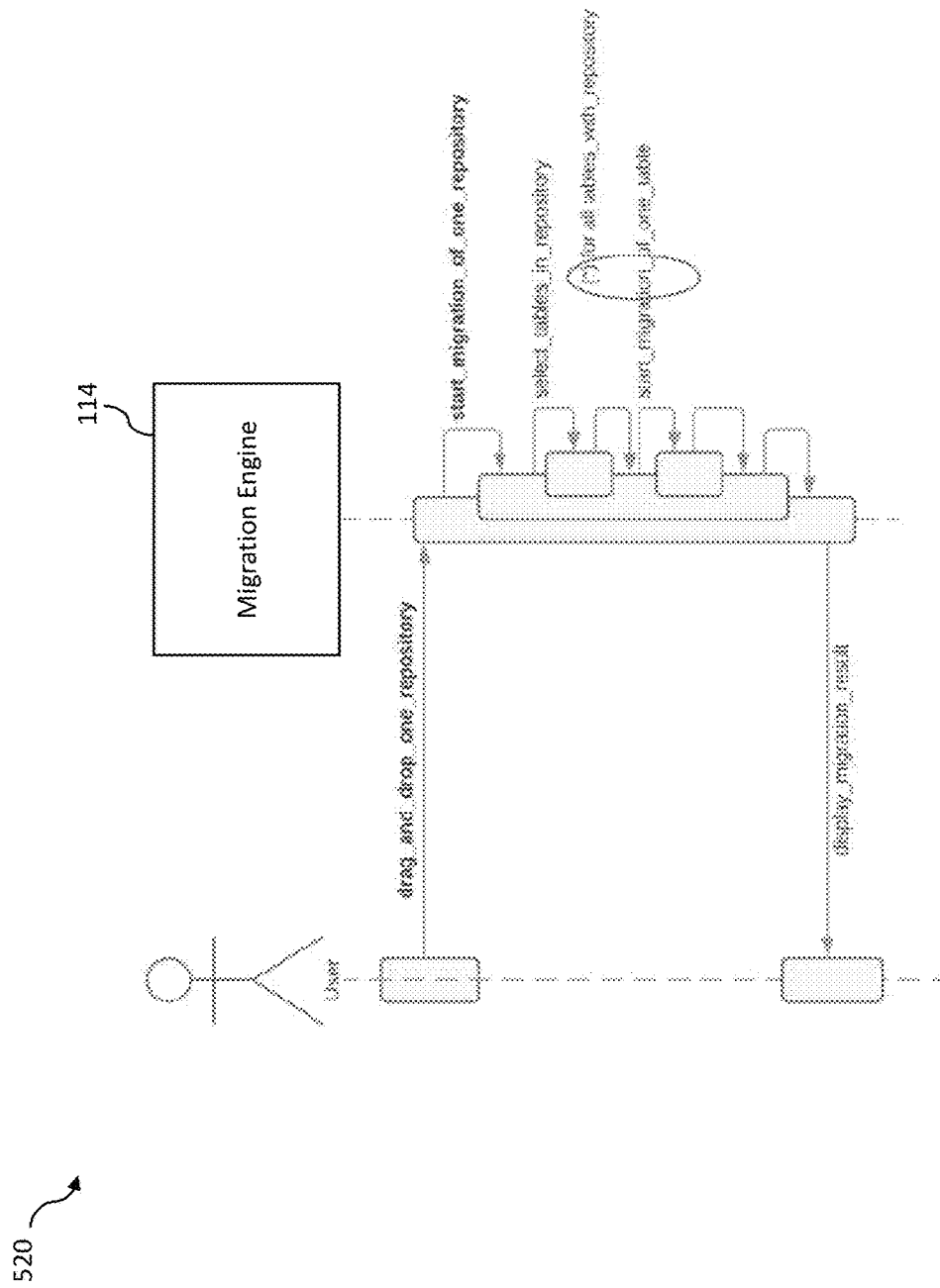

Diagram 520 of FIG. 5C illustrates user and migration engine 114 communication and processes for the migration of a content repository 112, according to aspects of the current subject matter. As illustrated, in response to the user dragging and dropping a source content repository into a target content repository, the migration engine 114 begins migration of the source content repository. The migration of the source content repository includes migrating all of the attachments in the source content repository (with independency of the table in which the links to the attachments are located) to the target content repository. The functionality of executing the migration of a table, as described with reference to FIG. 5B, is used for each table in the source content repository. In some implementations, progress of the migration may be updated after each link is updated in the source content repository, and the progress of the migration may be displayed on the graphical user interface so that the user may monitor and/or be kept informed of the progress. In some implementations, a migration result may be displayed on the graphical user interface.

Figure 5D:
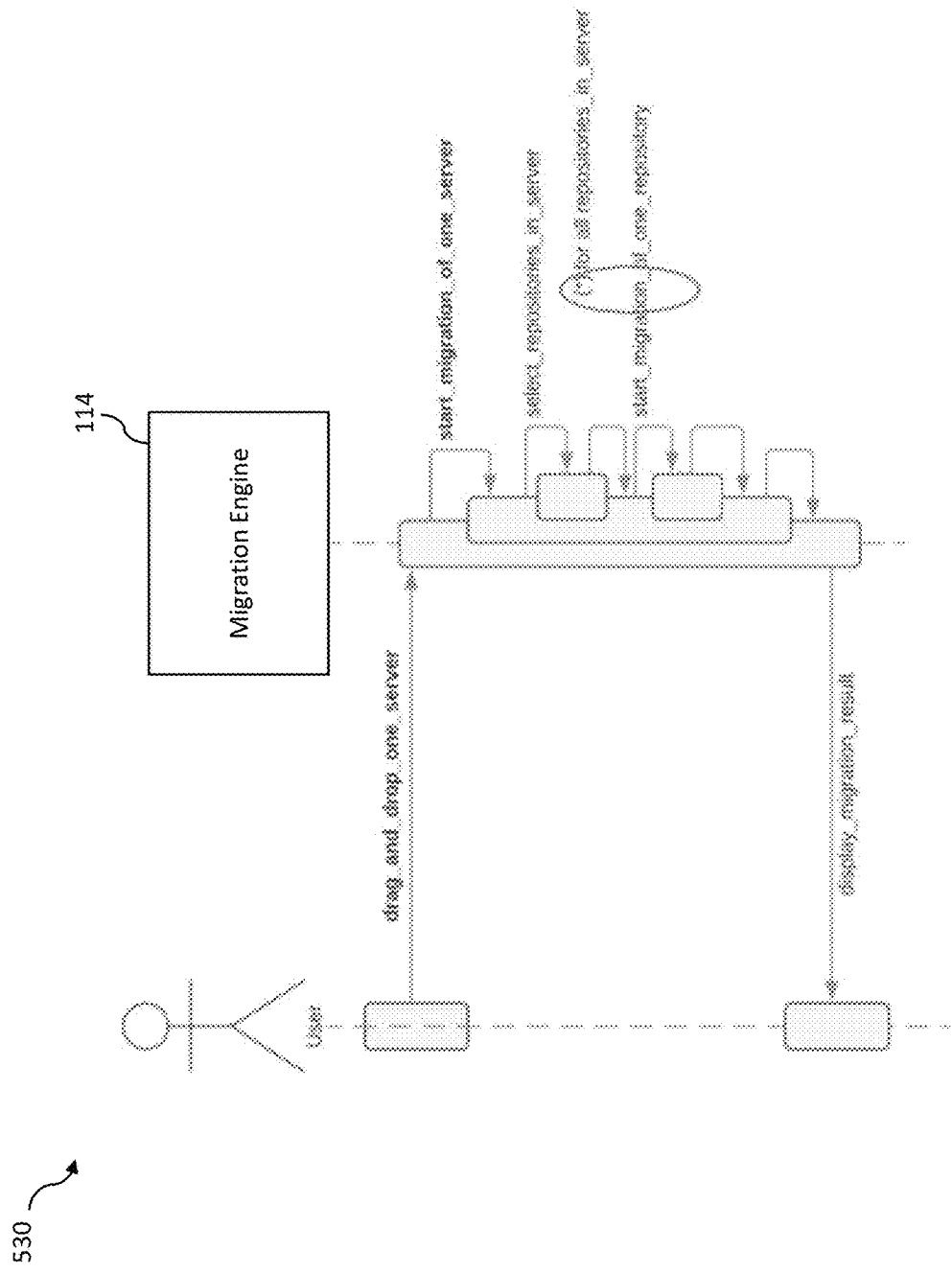

Diagram 530 of FIG. 5D illustrates user and migration engine 114 communication and processes for the migration of a content server 110, according to aspects of the current subject matter. As illustrated, in response to the user dragging and dropping a content server 110 into a target content repository, the migration engine 114 begins migration of the content server 110. The migration includes migrating all of the attachments in the content server 110 (all repositories with independency of the table in which the links to the attachments are located) to the target content repository. The functionality of executing the migration of a content repository, as described with reference to FIG. 5C, is used for each content repository in the content server 110. In some implementations, progress of the migration may be updated after each link is updated in the source content repository, and the progress of the migration may be displayed on the graphical user interface so that the user may monitor and/or be kept informed of the progress. In some implementations, a migration result may be displayed on the graphical user interface.

Figure 5E:
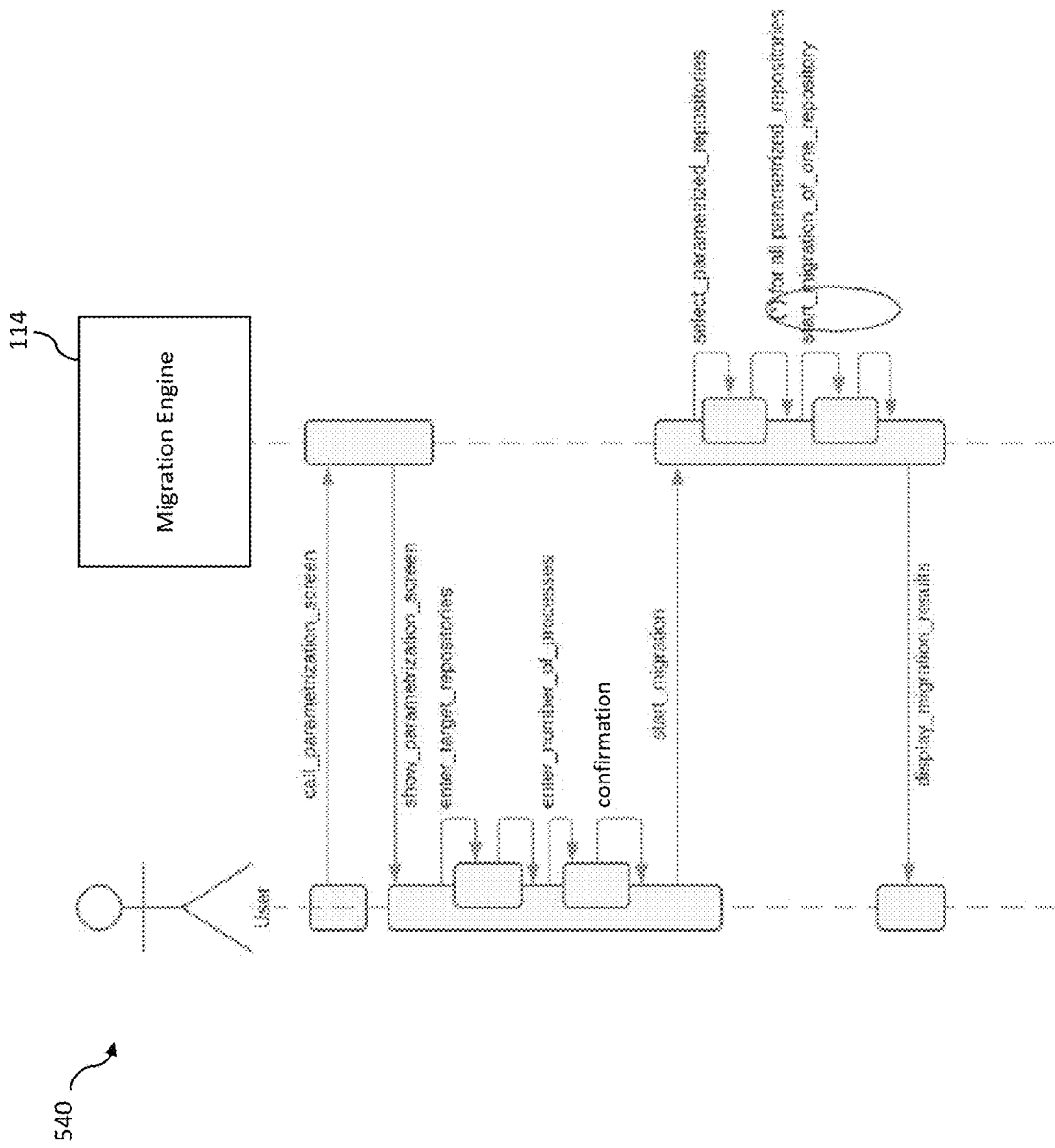

As described herein, the triggering of the desired migration process may be through the user entering data through a configuration or parameterization screen. Diagram 540 of FIG. 5E illustrates use of a parameterization screen to enter input data for the migration. The input data may include a target content repository for each source content repository and a number of processes to be used. Upon entry of the target content repository and the number of processes, the user may receive a confirmation message or the like and may indicate to the migration engine 114 to start the migration process. In some implementations, the migration process may start upon entry of the input data. As shown, for each repository, migration is implemented as described with reference to FIG. 5C.

Figure 6:
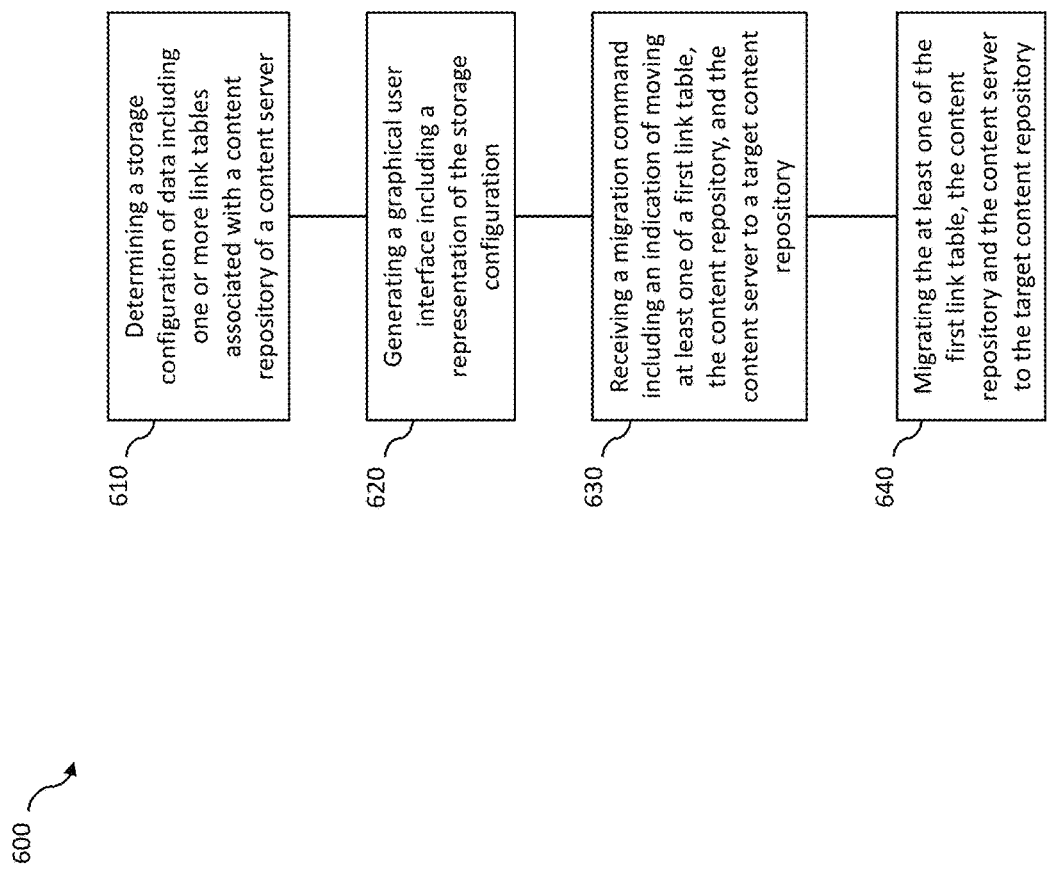
FIG. 6 depicts a flowchart illustrating a process for a user-facing approach for migration of unstructured data between content servers consistent with implementations of the current subject matter.

FIG. 6 depicts a flowchart 600 illustrating a process for a user-facing migration process for migrating unstructured data consistent with implementations of the current subject matter.

At 610, the migration engine 114 determines a storage configuration of data associated with a particular user (e.g., a user system). The storage configuration of data is also referred to herein as a scenario and is representative of the link tables 108 associated with the content repositories 112 and the content servers 110 of the user. For example, upon the user initiating the migration process (e.g., by accessing the migration engine 114 (or other action or selection or user signal at or from the user/client 102)), the migration engine 114 may respond by performing the analysis of the scenario or configuration of the link tables 108, the content servers 110, and/or the content repositories 112 to identify the current scenario (e.g., layout or system configuration) in order to build the corresponding graphical user interface, allowing for the user to interact and provide instructions for a desired migration process. As described herein, the one or more link tables 108 include links to attachments stored in the content server 110 as defined by the content repository 112.

According to aspects of the current subject matter, determining the storage configuration may include performing a domain search to identify standard tables and custom tables containing links to attachments, removing duplicate links from the identified tables, and identifying the content repository and the content server, the identification based on data associated with the identified tables.

At 620, the migration engine generates, for display at the user/client 102, the graphical user interface that includes a representation of the storage configuration. For example, the graphical user interface may include a plurality of icons, where each of the icons is representative of one of the one or more link tables, the content repository, and the content server. For example, according to aspects of the current subject matter, the graphical user interface may include a representation such as the representation 200 of FIG. 2 and/or the layouts 400, 425, and/or 450 of FIG. 4A-FIG. 4C, or variations thereof.

At 630, the migration engine 114 receives a migration command from the user/client 102. The migration command may be a drag and drop operation, for example those described with reference to FIG. 5B-FIG. 5D, or entry of input data on a parameterization screen as described with reference to FIG. 5E. The migration command may include an indication of moving at least one of a first link table of the one or more link tables, the content repository, and the content server to a target content repository.

At 640, the migration engine 114 performs the migration operation based on the received migration command. For example, the at least one of the first link table, the content repository, and the content server are migrated to the target content repository. The migration operation may include migrating the attachments to the target content repository, and updating the links in the content repository, as described with reference to FIG. 5B-FIG. 5E.

Aspects of the current subject matter thus advantageously provide for minimal user input to perform a migration of unstructured data between content repositories. In response to drag and drop operations, or input of desired migration parameters, the migration tasks are performed in the background. The migration tasks are scheduled in the proper sequence, and the migration process is transparent to the user. The graphical user interface that is generated provides for simplified user operations and optionally provides status feedback to the user. The described user-facing approach for migration eliminates the need for a database management consultant to manually execute the reports necessary for unstructured data migration. The graphical user interface also eliminates the possibility of errors in the sequence of the migration because the system knows what is to be done and it executes the reports in the correct sequence.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 7:
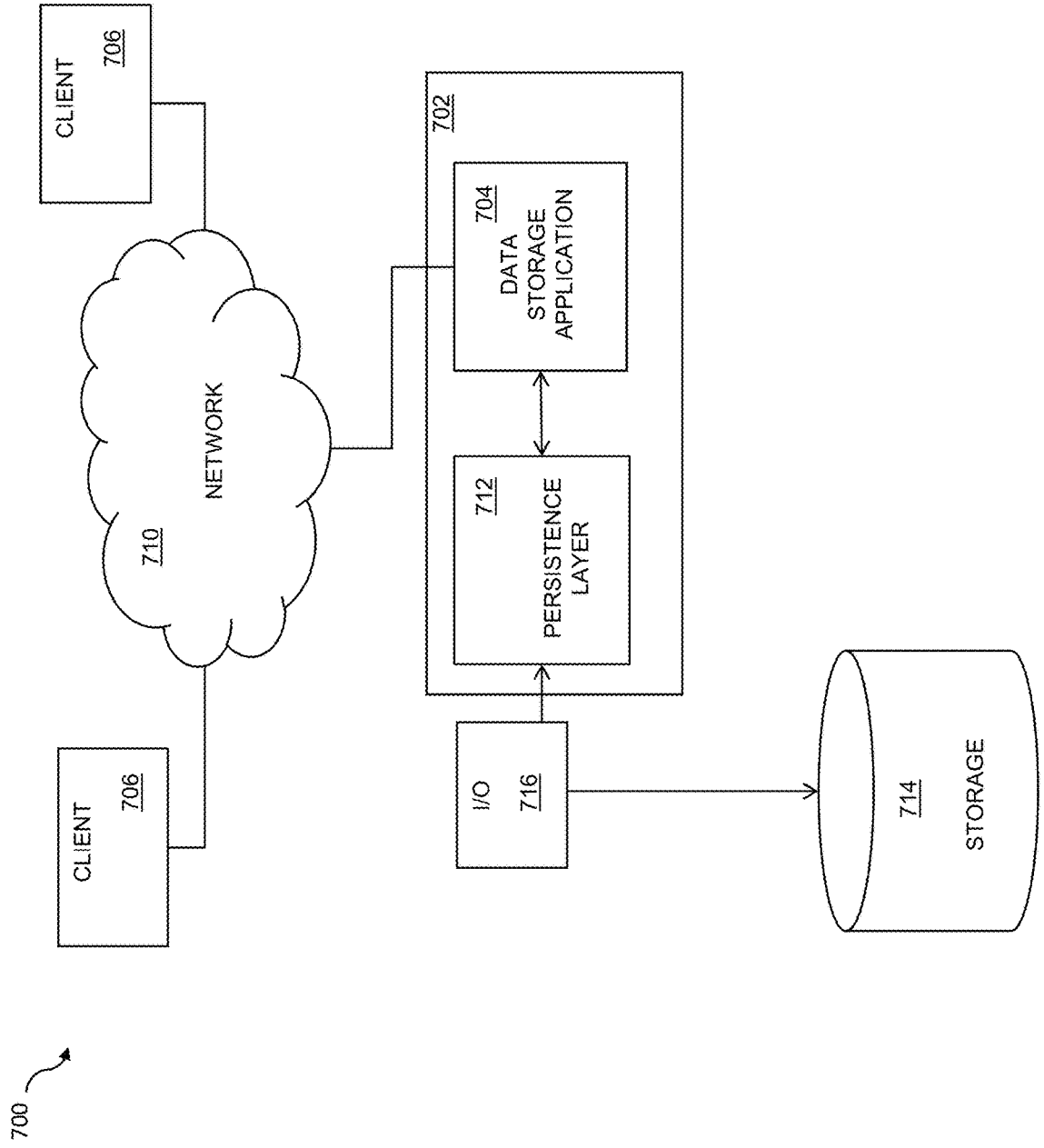
FIG. 7 is a diagram illustrating an exemplary system including a data storage application, according to some implementations of the current subject matter.

FIG. 7 illustrates an exemplary system 700 in which a computing system 702, which may include one or more programmable processors that may be collocated, linked over one or more networks, etc., executes one or more modules, software components, or the like of a data storage application 704, according to some implementations of the current subject matter. The data storage application 704 may include one or more of a database, an enterprise resource program, a distributed storage system (e.g. NetApp Filer available from NetApp of Sunnyvale, CA), or the like.

The one or more modules, software components, or the like may be accessible to local users of the computing system 702 as well as to remote users accessing the computing system 702 from one or more client machines 706 over a network connection 710. One or more user interface screens produced by the one or more first modules may be displayed to a user, either via a local display or via a display associated with one of the client machines 706. Data units of the data storage application 704 may be transiently stored in a persistence layer 712 (e.g., a page buffer or other type of temporary persistency layer), which may write the data, in the form of storage pages, to one or more storages 714, for example via an input/output component 716. The one or more storages 714 may include one or more physical storage media or devices (e.g. hard disk drives, persistent flash memory, random access memory, optical media, magnetic media, and the like) configured for writing data for longer term storage. It should be noted that the storage 714 and the input/output component 716 may be included in the computing system 702 despite their being shown as external to the computing system 702 in FIG. 7.

Data retained at the longer term storage 714 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 8:
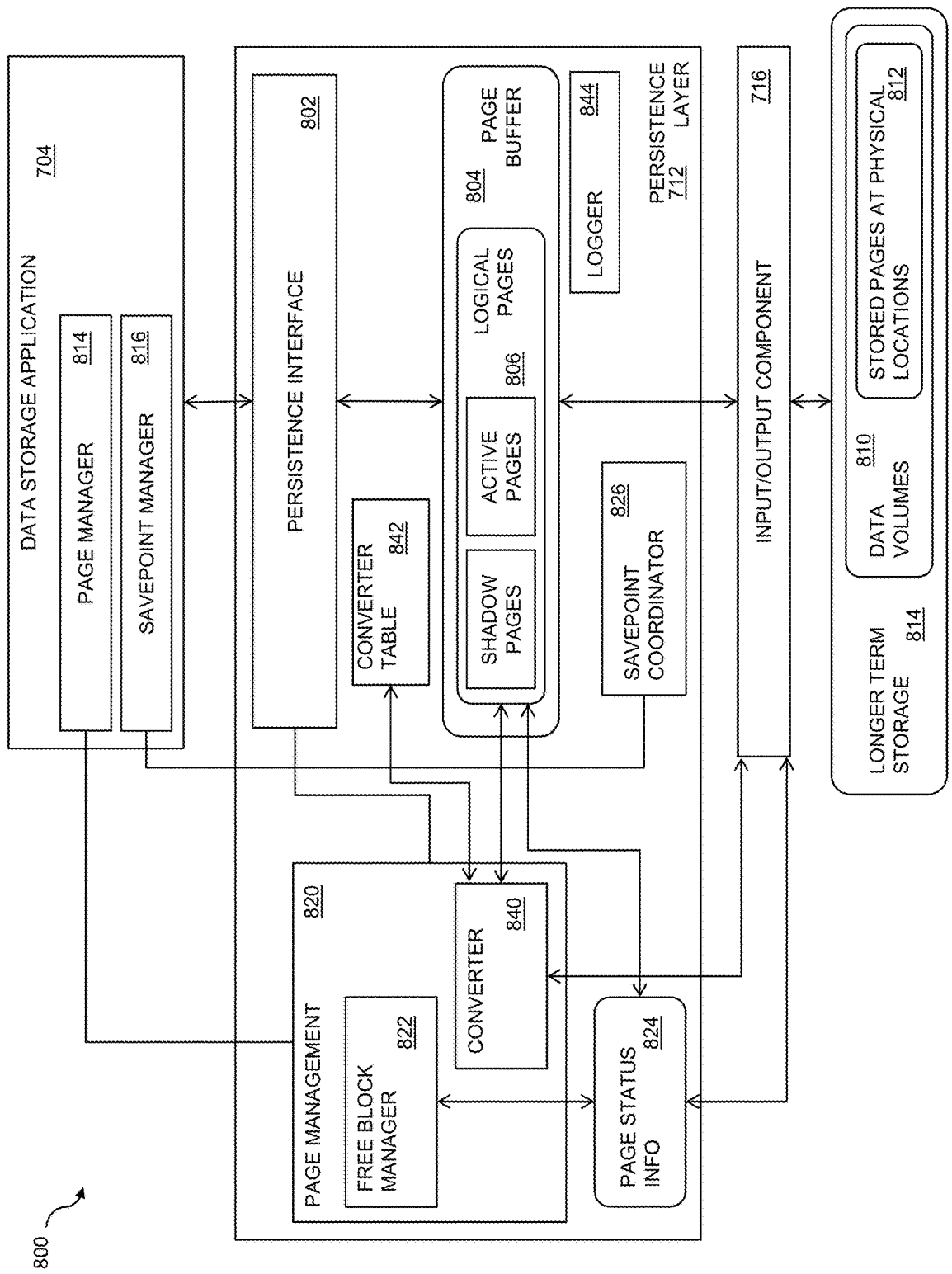
FIG. 8 is a diagram illustrating details of the system of FIG. 7.

FIG. 8 illustrates exemplary software architecture 800, according to some implementations of the current subject matter. A data storage application 704, which may be implemented in one or more of hardware and software, may include one or more of a database application, a network-attached storage system, or the like. According to at least some implementations of the current subject matter, such a data storage application 704 may include or otherwise interface with a persistence layer 712 or other type of memory buffer, for example via a persistence interface 802. A page buffer 804 within the persistence layer 712 may store one or more logical pages 806, and optionally may include shadow pages, active pages, and the like. The logical pages 806 retained in the persistence layer 712 may be written to a storage (e.g. a longer term storage, etc.) 714 via an input/output component 716, which may be a software module, a sub-system implemented in one or more of software and hardware, or the like. The storage 714 may include one or more data volumes 810 where stored pages 812 are allocated at physical memory blocks.

In some implementations, the data storage application 704 may include or be otherwise in communication with a page manager 814 and/or a savepoint manager 816. The page manager 814 may communicate with a page management module 820 at the persistence layer 712 that may include a free block manager 822 that monitors page status information 824, for example the status of physical pages within the storage 714 and logical pages in the persistence layer 712 (and optionally in the page buffer 804). The savepoint manager 816 may communicate with a savepoint coordinator 826 at the persistence layer 712 to handle savepoints, which are used to create a consistent persistent state of the database for restart after a possible crash.

In some implementations of a data storage application 704, the page management module of the persistence layer 712 may implement a shadow paging. The free block manager 822 within the page management module 820 may maintain the status of physical pages. The page buffer 804 may include a fixed page status buffer that operates as discussed herein. A converter component 840, which may be part of or in communication with the page management module 820, may be responsible for mapping between logical and physical pages written to the storage 714. The converter 840 may maintain the current mapping of logical pages to the corresponding physical pages in a converter table 842. The converter 840 may maintain a current mapping of logical pages 806 to the corresponding physical pages in one or more converter tables 842. When a logical page 806 is read from storage 714, the storage page to be loaded may be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 may ensure that changes made in the data storage application 704 are durable and that the data storage application 704 may be restored to a most recent committed state after a restart. Writing data to the storage 714 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 844 may also be included to store the changes made to the data of the data storage application in a linear log. The logger component 844 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 844 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 712 may use a combination of undo log entries (from one or more logs) and shadow paging.

The persistence interface 802 may handle read and write requests of stores (e.g., in-memory stores, etc.). The persistence interface 802 may also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 844 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 844 may write a database log (or simply referred to herein as a "log") sequentially into a memory buffer in natural order (e.g., sequential order, etc.). If several physical hard disks/storage devices are used to store log data, several log partitions may be defined. Thereafter, the logger 844 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 704 may use shadow paging so that the savepoint manager 816 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 9:
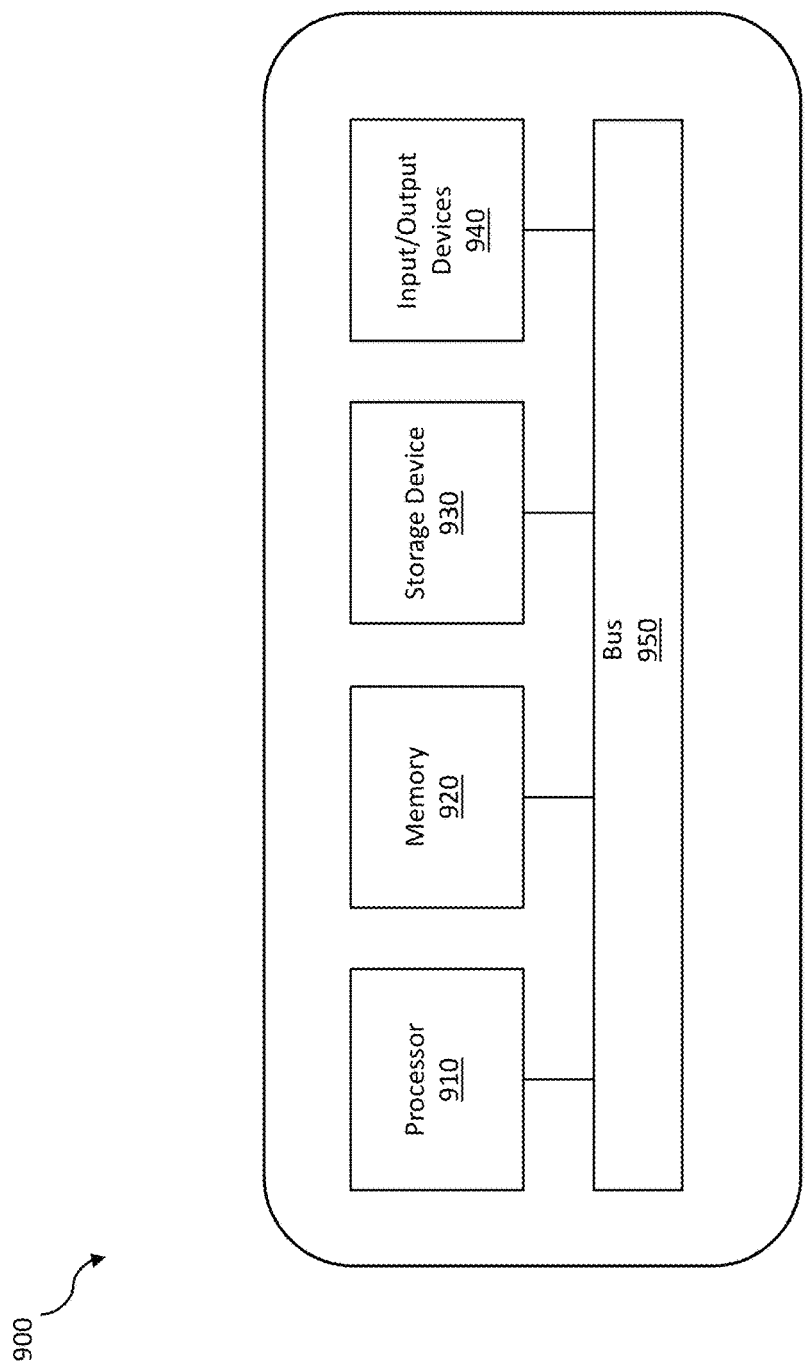
FIG. 9 depicts a block diagram illustrating a computing system consistent with implementations of the current subject matter.

FIG. 9 depicts a block diagram illustrating a computing system 900 consistent with implementations of the current subject matter. In some implementations, the current subject matter may be configured to be implemented in a system 900.

As shown in FIG. 9, the computing system 900 can include a processor 910, a memory 920, a storage device 930, and input/output devices 940. The processor 910, the memory 920, the storage device 930, and the input/output devices 940 can be interconnected via a system bus 950. The processor 910 is capable of processing instructions for execution within the computing system 900. Such executed instructions can implement one or more components of, for example, the system 100. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900.

In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
    determining, by a processing device and in response to a user signal from a user device, a storage configuration of data associated with a user, the storage configuration comprising one or more link tables at a database management system including the processing device configured to provide a migration engine, wherein the one or more link tables are associated with a content repository of a content server, wherein the one or more link tables include links to attachments stored in the content server as defined by the content repository, wherein a corresponding link to a corresponding attachment is defined by a content repository identifier and a document identifier;
    generating, by the processing device and for display at the user device, a graphical user interface comprising a representation of the storage configuration, wherein the representation of the graphical user interface includes a first graphical icon for a first link table of the one or more link tables, a second graphical icon for the content repository, a third graphical icon for the content server, and a fourth graphical icon for to a target content repository;
    receiving, by the processing device and in response to user interaction with the graphical user interface indicating a drop and drag of at least the first graphical icon, the second graphical icon, the third graphical icon to the fourth graphical icon, a migration command, wherein the migration command includes an indication of moving at least one of a first link table of the one or more link tables, the content repository, and the content server to the target content repository; and
    migrating, by the processing device, the at least one of the first link table of the one or more link tables, the content repository, and the content server to the target content repository.

2. The computer-implemented method of claim 1, wherein determining the storage configuration comprises:
    performing a domain search to identify standard tables and custom tables containing links to attachments;
    removing duplicate links from the identified standard tables and the identified custom tables; and
    identifying the content repository and the content server, the identification based on data associated with the identified standard tables and the identified custom tables.

3. The computer-implemented method of claim 1, wherein the representation of the storage configuration comprises a plurality of icons, each of the plurality of icons representative of one of the one or more link tables, the content repository, and the content server.

4. The computer-implemented method of claim 1, wherein the drop and drag triggers the migration command.

5. The computer-implemented method of claim 1, wherein the target content repository is one of associated with the content server or associated with a second content server.

6. The computer-implemented method of claim 1, wherein migrating comprises:

migrating the attachments to the target content repository; and updating the links in the content repository.

7. The computer-implemented method of claim 1, wherein the content repository comprises a logical structure that defines where the attachments are stored in the content server.

8. The computer-implemented method of claim 1, wherein a database management system includes the one or more link tables and the processing device configured as a migration engine.

9. A system, comprising:
at least one data processor; and
at least one memory storing instructions which, when executed by the at least one data processor, result in operations comprising:
determining, by a processing device and in response to a user signal from a user device, a storage configuration of data associated with a user, the storage configuration comprising one or more link tables at a database management system including the processing device configured to provide a migration engine, wherein the one or more link tables are associated with a content repository of a content server, wherein the one or more link tables include links to attachments stored in the content server as defined by the content repository, wherein a corresponding link to a corresponding attachment is defined by a content repository identifier and a document identifier;
generating, by the processing device and for display at the user device, a graphical user interface comprising a representation of the storage configuration, wherein the representation of the graphical user interface includes a first graphical icon for a first link table of the one or more link tables, a second graphical icon for the content repository, a third graphical icon for the content server, and a fourth graphical icon for to a target content repository;
receiving, by the processing device and in response to user interaction with the graphical user interface indicating a drop and drag of at least the first graphical icon, the second graphical icon, the third graphical icon to the fourth graphical icon, a migration command, wherein the migration command includes an indication of moving at least one of a first link table of the one or more link tables, the content repository, and the content server to the target content repository; and
migrating, by the processing device, the at least one of the first link table of the one or more link tables, the content repository, and the content server to the target content repository.

10. The system of claim 9, wherein determining the storage configuration comprises:
performing a domain search to identify standard tables and custom tables containing links to attachments;
removing duplicate links from the identified standard tables and the identified custom tables; and
identifying the content repository and the content server, the identification based on data associated with the identified standard tables and the identified custom tables.

11. The system of claim 9, wherein the representation of the storage configuration comprises a plurality of icons, each of the plurality of icons representative of one of the one or more link tables, the content repository, and the content server.

12. The system of claim 9, wherein the drop and drag triggers the migration command.

13. The system of claim 9, wherein the target content repository is one of associated with the content server or associated with a second content server.

14. The system of claim 9, wherein migrating comprises:
migrating the attachments to the target content repository; and
updating the links in the content repository.

15. A non-transitory computer-readable storage medium including program code, which when executed by at least one data processor, causes operations comprising:
determining, by a processing device and in response to a user signal from a user device, a storage configuration of data associated with a user, the storage configuration comprising one or more link tables at a database management system including the processing device configured to provide a migration engine, wherein the one or more link tables are associated with a content repository of a content server, wherein the one or more link tables include links to attachments stored in the content server as defined by the content repository, wherein a corresponding link to a corresponding attachment is defined by a content repository identifier and a document identifier;
generating, by the processing device and for display at the user device, a graphical user interface comprising a representation of the storage configuration, wherein the representation of the graphical user interface includes a first graphical icon for a first link table of the one or more link tables, a second graphical icon for the content repository, a third graphical icon for the content server, and a fourth graphical icon for to a target content repository;
receiving, by the processing device and in response to user interaction with the graphical user interface indicating a drop and drag of at least the first graphical icon, the second graphical icon, the third graphical icon to the fourth graphical icon, a migration command, wherein the migration command includes an indication of moving at least one of a first link table of the one or more link tables, the content repository, and the content server to the target content repository; and
migrating, by the processing device, the at least one of the first link table of the one or more link tables, the content repository, and the content server to the target content repository.

16. The non-transitory computer-readable storage medium of claim 15, wherein determining the storage configuration comprises:
performing a domain search to identify standard tables and custom tables containing links to attachments;
removing duplicate links from the identified standard tables and the identified custom tables; and
identifying the content repository and the content server, the identification based on data associated with the identified standard tables and the identified custom tables.

17. The non-transitory computer-readable storage medium of claim 15, wherein the representation of the storage configuration comprises a plurality of icons, each of the plurality of icons representative of one of the one or more link tables, the content repository, and the content server.

18. The non-transitory computer-readable storage medium of claim 15, wherein the drop and drag triggers the migration command.

19. The non-transitory computer-readable storage medium of claim 15, wherein the target content repository is one of associated with the content server or associated with a second content server.

20. The non-transitory computer-readable storage medium of claim 15, wherein migrating comprises:
   migrating the attachments to the target content repository; and
   updating the links in the content repository.

* * * * *